United States Patent [19]
Sangeeta et al.

[11] Patent Number: 6,146,692
[45] Date of Patent: Nov. 14, 2000

[54] CAUSTIC PROCESS FOR REPLACING A THERMAL BARRIER COATING

[75] Inventors: D. Sangeeta, Niskayuna, N.Y.; Howard John Farr, Cincinnati; Roger Dale Wustman, Loveland, both of Ohio

[73] Assignee: General Electric Company, Schenectady, N.Y.

[21] Appl. No.: 09/210,655

[22] Filed: Dec. 14, 1998

[51] Int. Cl.⁷ .................................................. B05D 3/10
[52] U.S. Cl. .......................................... 427/142; 29/889.1
[58] Field of Search ........................... 427/142; 29/889.1; 134/2

[56] References Cited

U.S. PATENT DOCUMENTS

| | | | |
|---|---|---|---|
| 4,141,781 | 2/1979 | Greskovich et al. | 156/637 |
| 4,317,685 | 3/1982 | Ahuja et al. | 134/2 |
| 4,439,241 | 3/1984 | Ault et al. . | |
| 5,507,306 | 4/1996 | Irvine et al. . | |
| 5,575,858 | 11/1996 | Chen et al. . | |
| 5,643,474 | 7/1997 | Sangeeta | 216/96 |

FOREIGN PATENT DOCUMENTS 9530032  11/1995  WIPO .

OTHER PUBLICATIONS

"New Method for Turbine Blade Internal Cleaning", by J. D. Irvine et al., presented at the International Gas Turbine and Aeroengine Congress and Exposition, Houston, TX, Jun. 5–8, 1995.

*Primary Examiner*—Katherine A. Bareford
*Attorney, Agent, or Firm*—Noreen C. Johnson; Douglas E. Stoner

[57] ABSTRACT

An aqueous caustic process can be used for replacing a thermal barrier coating on a metal surface. In the process, the metal surface is contacted with a caustic solution to remove the thermal barrier coating. The processing conditions for contacting the caustic solution are selected to avoid the formation of a peel layer during a subsequent application of a replacement thermal barrier coating and heat treatment. A replacement thermal barrier coating is then reapplied to the metal surface.

14 Claims, No Drawings

CAUSTIC PROCESS FOR REPLACING A THERMAL BARRIER COATING

BACKGROUND OF THE INVENTION

This invention is related to removing thermal barrier coatings from surfaces. More particularly, the invention is related to removing thermal barrier coatings without attacking underlying coatings, such as nickel aluminide or platinum nickel aluminide.

Higher operating temperatures increase the efficiency of gas turbine engines. Advanced propulsion technology now involves the operation of engines at temperatures of 1000° C. and above. Such high operating temperatures challenge the durability of engine components. The use of nickel and cobalt-base superalloys has provided some advance in high temperature durability. However in certain sections of a gas turbine engine, such as in the turbine, combustor and augmentor, the metallic components must be coated with a thermal insulator to provide further high temperature operation durability.

Thermal barrier coatings (TBC) are typically used on metallic components to provide the further high temperature operation durability required in many sections of the modern turbine engines. Thermal barrier coatings typically include a ceramic coating deposited on a metallic bond layer that is deposited on the metallic component surface. Typically the bond layer is platinum nickel aluminide, nickel aluminide, aluminided MCrAlY (where M equals nickel, cobalt, nickel-cobalt and iron; Cr is chromium; Al is aluminum; Y is yttrium) or mixtures thereof. The ceramic coating can be some form of stabilized zirconia, such as zirconia stabilized with calcia, hafnia, magnesia, yttria or any of the rare earth oxides, which form a refractory oxide thermal barrier coating. The thermal barrier coating has a very low thermal conductivity, low density and high melting point.

During service life, coated metallic components of engines for commercial aircraft, some military aircraft and for power generation, crack, spall or undergo chemical and physical attack. Hence, periodically these engines must be overhauled. During overhaul, turbine blades and vanes that have not exceeded creep limits and are not otherwise severely eroded or damaged can be refurbished for reuse. Coatings, such as the thermal barrier coating and bond coat, are stripped from the metallic component and the component is reworked and cleaned, recoated and returned to service. The thermal barrier coating must be completely removed before recoating the metallic surface with fresh bond layer and thermal barrier coating.

Ault, U.S. Pat. 4,439,241 discloses cleaning a turbine part, repairing the part, e.g., by welding or straightening, and reapplying the external coating. In the process, a part, such as a turbine blade, is disposed in a holder in an autoclave and is subjected to the flow of an alkaline solution of potassium hydroxide (KOH) or sodium hydroxide (NaOH) and water at a temperature between 150° C. to 235° C., at a pressure between 150 psi to 350 psi. The potassium hydroxide solution is 10–45 weight percent.

First stage turbine blades experience a build up of silicon-calcium (Si-Ca) rich dirt and debris during engine service that inhibits the flow of cooling air and creates hot spots, which lead to accelerated internal corrosion that may cause through-wall material failure. Previous autoclave processes have been ineffective at removing large amounts of this internal debris. Irvine et al, New Method for Turbine Blade Internal Cleaning, a paper presented at the Internal Gas Turbine and Aeroengine Congress and Exposition, Houston, Texas, June 5–8, 1995, proposes pumping heated caustic at pressures approaching 400 psi through the internal cavities of turbine blades. The increased caustic flow from this process, compared to previous autoclave processes, improves cleaning effectiveness. The process reduces repair costs by improving part yield during repair.

The caustic process can be used to clean engine parts such as air foils and can also be used to remove ceramic cores from airfoil castings. The caustic reacts with oxides and hydroxides to form salts of the alkali metals which are soluble in water. This chemical reaction makes it possible to clean airfoils and to remove ceramic cores. Additionally, the chemical reaction of the caustic process has been proposed to remove thermal barrier coatings by dissolving the alumina interface between the thermal barrier coating and the underling metallic component. Unfortunately under the conditions taught in the art, the caustic process also attacks the nickel aluminide or platinum nickel aluminide of the underlying metallic component. When the metallic component is subsequently cleaned and recoated with thermal barrier coating and heat treated, a black layer believed to be mostly nickel oxide, peels from the airfoil internal and external surface. Thus, there is a need to provide a caustic process to remove thermal barrier coatings from an underlying metallic component without forming the undesired black peel (flakes). The present invention is based on the discovery that the peel layer (flakes) may be avoided by conducting the caustic process under selected processing conditions.

SUMMARY OF THE INVENTION

The invention is an aqueous caustic process for replacing a thermal barrier coating on a metal surface. In particular, this invention is related to the chemical removal of yttria-stabilized zirconia thermal barrier coatings deposited by physical vapor deposition or air plasma spray on superalloy substrates having a bond coat. In the process, the surface of the coated part is contacted with a caustic solution to remove the thermal barrier coating. The processing conditions for contacting the caustic solution are selected to avoid the formation of a peel layer during a subsequent application of a replacement or repair thermal barrier coating and heat treatment. A replacement or repair thermal barrier coating is then reapplied to the metal surface. The peel layer is an oxidation product of nickel aluminide or platinum nickel aluminide.

In another aspect, the invention is an aqueous caustic process for treating a nickel aluminide-containing, platinum nickel aluminide-containing, or MCrAlY aluminide-containing metal surface to remove the thermal barrier coatings or other caustic soluble ceramic coatings. The metal surface is contacted with a caustic solution under processing conditions selected to avoid the reaction of the caustic with the nickel aluminide or platinum nickel aluminide so that a peel layer is not formed during a subsequent application of a thermal barrier coating and heat treatment. A replacement thermal barrier coating is then reapplied to the metal surface.

DETAILED DESCRIPTION OF THE INVENTION

The invention provides a method for removing thermal barrier coatings from flat and contoured surfaces by treating the thermal barrier coated surface in an autoclave with a caustic solution at a concentration, temperature, pressure and a time sufficient to completely remove the thermal barrier coating without damaging an underlying bond layer or a substrate surface and without forming a peel layer (flakes) after the thermal barrier coating is reapplied and heat treated. The atmosphere in the autoclave chamber is substantially oxygen-free. This means that the autoclave chamber is purged with an inert gas, such as argon, helium, and nitrogen, so that the oxygen level is less than fifty parts per million, and alternatively, the oxygen level is less than ten parts per million.

The thermal barrier coating (TBC) is generally a chemically stabilized zirconia, such as yttria stabilized zirconia, calcia, stabilized zirconia or magnesia stabilized zirconia. Other oxide or ceramic coatings that act as a thermal barrier may also be referred to as the thermal barrier coating for the purposes of this invention. Also, the invention includes the removal of other caustic soluble ceramic oxide coatings that might not be used as thermal barrier coatings. Herein, bond coats are usually meant to be metallic compositions, including platinum-nickel aluminum, aluminum, nickel aluminum, nickel-chromium-aluminum-yttrium, iron-chromium-aluminum-yttria, cobalt-chromium-aluminum-yttrium and nickel-cobalt-chromium-aluminum-yttrium.

Substrate materials often used in turbines for aircraft engines and power generation equipment may be nickel, cobalt or iron based superalloys. Examples of such substrates are GTD-111, GTD-222, Rene-80, Rene 41, Rene 142, N-5, Rene 125, Rene 77, Rene 95, Inconel 706, Inconel 718, Inconel 625, cobalt-based HS188, cobalt-based L-605 and stainless steels. The process is especially suited for thermal barrier coated parts and hardware used in turbines or on airfoils. An example of a turbine part is a turbine blade or vane. The term airfoil refers also to turbine ;parts, such as blades, vanes, buckets, nozzles and the like.

Additional substrate materials that can accommodate a thermal barrier coating for applications other than turbine parts, may be used in this invention. For instance, it is also contemplated that this invention may be utilized for removal of thermal barrier coatings in electronic applications and power generation such as gas, steam and nuclear to mention a few.

The caustic solution generally comprises an alkali hydroxide, such as potassium hydroxide (KOH), sodium hydroxide (NaOH), and lithium hydroxide, or a non alkali hydroxide, such as ammonium hydroxide ($NH_4OH$), triethylamine (TEA), tetramethylammonium hydroxide (TMAH), and mixtures thereof. The caustic solution can be an aqueous solution where the alkali hydroxide compound or the non alkali hydroxide compound is mixed with water. Use of additives, such as surfactants and chelates, to further reduce the surface tension of the caustic solution can be beneficial. The caustic compound and the water may be present in about a two to three ratio. The concentrations of the bases may range from about forty to forty-five weight percent for potassium hydroxide to about forty to fifty weight percent of sodium hydroxide.

The process of the invention is conducted in an autoclave reactor. The autoclave reactor is a pressure vessel and is built to withstand high pressures at high temperatures. Pressure in the system is elevated by heating the contents (reaction mixture) in the autoclave or by using an external source of compressed gases to over pressurize the vessel. The autoclave may be operated in batch fashion; that is, the ingredients of the caustic organic solution are charged, the unit is closed, and the charge is brought to the desired conditions of temperature and pressure. Continuous or semi-continuous operation can be undertaken if one or more of the reactants are continuously fed and products withdrawn.

The temperature and pressure that is used during treatment can vary, depending on the amount and the type of thermal barrier coating to be removed and the capabilities of the autoclave reactor. The caustic treatment can be performed at a range of temperatures, pressures, and reaction times. For example, the treatment may involve combinations of ultrasonic agitation, mechanical mixing, and boiling with an autoclave treatment. The autoclave treatment can be conducted under several conditions. For instance, the pressure can range from about 400 pounds per square inch to about 800 pounds per square inch or higher, and the temperature can range from about 2300° C. to about 2500° C. Higher pressures and temperatures can be applied to achieve shorter process times. Also, pressurization can be achieved at room temperature using compressed gases. Still yet, the process can start with zero pressure and by increasing the temperature of the reaction mixture, the autoclave pressure automatically rises resulting from the increase in the vapor pressure of the reaction mixture. The time to remove the thermal barrier coating depends on the amount of the coating to be removed and the temperature and pressure conditions that are applied. Usually, the time is between about 5 minutes to about 4.0 hours. Also, it should be noted that using a mixer, such as a mechanical stirrer, a magnetic stirrer, or an ultrasonicator, at high pressures may enhance the ability of the caustic solution to remove the thermal barrier coating in torcherous locations and within a shorter duration of time.

EXAMPLES

A number of caustic solutions containing potassium hydroxide (KOH) and sodium hydroxide (NaOH) were tested at different processing conditions. A list of selected conditions is provided in TABLE I.

TABLE I

| Wt % of Caustic in Water | Temperature (°C.) | Pressure w/Nnitrogen (psi) | Process Time (Hours) | TBC Removed | Attack on NiA/ Coating |
|---|---|---|---|---|---|
| 40 KOH | 230 | 800 | 4 | Yes | No |
| 45 KOH | 250 | 800 | 4 | Yes | No |
| 40 KOH | 250 | 600 | 1 | Yes | No |
| 45 KOH | 230 | 600 | 1 | Yes | No |
| 40 NaOH | 230 | 800 | 1 | Yes | No |
| 50 NaOH | 250 | 800 | 1 | Yes | No |
| 40 NaOH | 250 | 600 | 1 | Yes | No |
| 50 NaOH | 230 | 600 | 1 | Yes | No |
| 30 KOH | 200 | 160 | 5 Min | Partially | No |
| 45 KOH | 200 | 200 | 5 Min | Yes | No |
| 30 KOH | 230 | 425 | 4 | Yes | Yes |
| 45 KOH | 230 | 400 | 4 | Yes | No |

The results indicate that lower concentrations (30 weight percent) of caustic attack the nickel aluminide layer and cause the formation of a peel layer (flakes) during subsequent reapplication of the thermal barrier coating. Additionally, temperatures above 250° C. cause base metal attack or nickel aluminide coating attack if the autoclave chamber is not purged with an inert gas to oxygen levels below fifty (50) ppm.

We claim:

1. An aqueous caustic process for replacing a thermal barrier coating on a metal surface, comprising:

(A) contacting the metal surface with an aqueous caustic solution to remove the thermal barrier coating from said surface under processing conditions selected to avoid the formation of a peel layer during a subsequent application of a replacement thermal barrier coating and heat treatment, the selected conditions including a temperature in a range from about 230° C. to about 250° C., a time period in a range from about 5 minutes to about 4 hours. the caustic solution comprising KOH being provided at a concentration in a range from about 40 wt % to about 45 wt % or NaOH at a concentration in a range from about 40 wt % to about 50 wt %, and a pressure in a range from about 400 psi to about 800 psi all of which being provided in a substantially oxygen-free environment; and (B) applying said replacement thermal barrier coating.

2. The process of claim 1, wherein said metal surface is contacted with a caustic solution of about 40 to about 50 weight percent NaOH under said selected conditions.

3. The process of claim 1, wherein said metal surface is contacted with a caustic solution under a nitrogen atmosphere.

4. The process of claim 1, wherein said metal surface is contacted with a caustic solution under an argon atmosphere.

5. The process of claim 1, wherein said metal surface includes a nickel aluminide coating or a platinum nickel aluminide coating.

6. The process of claim 1, wherein said metal surface is in the form of an airfoil.

7. The process of claim 1, wherein the process takes place in an autoclave chamber.

8. The process of claim 7, wherein the autoclave atmosphere contains less than fifty parts per million oxygen.

9. An aqueous caustic process for treating a nickel aluminide-containing metal surface, platinum nickel aluminide-containing metal surface, MCrAlY aluminide-containing metal surface or mixtures thereof to remove a thermal barrier coating or other caustic soluble ceramic coating, comprising:

(A) contacting the metal surface with an aqueous caustic solution to remove a thermal barrier coating or other caustic soluble ceramic coating under processing conditions selected to avoid the reaction of said caustic with said nickel aluminide, platinum nickel aluminide, or mixtures thereof to avoid forming a peel layer during application of a new thermal barrier coating and heat treatment, the selected conditions including a temperature in a range from about 230° C. to about 250° C., a time period in a range from about 5 minutes to about 4 hours the caustic solution comprising KOH being provided at a concentration in a range from about 40 wt % to about 45 wt % or NaOH at a concentration in a range from about 40 wt % to about 50 wt %, and a pressure in a range from about 400 psi to about 800 psi all of which being provided in a substantially oxygen-free environment; and (B) applying said new thermal barrier coating.

10. The process of claim 9, wherein said metal surface is contacted with a caustic solution under a nitrogen atmosphere.

11. The process of claim 9, wherein said metal surface is contacted with a caustic solution under an argon atmosphere.

12. The process of claim 9, wherein said metal surface is in the form of an airfoil.

13. The process of claim 9, wherein the process takes place in an autoclave chamber.

14. The process of claim 13, wherein the autoclave atmosphere contains less than fifty parts per million oxygen.

* * * * *